(12) United States Patent
Yang et al.

(10) Patent No.: US 12,335,045 B2
(45) Date of Patent: Jun. 17, 2025

(54) TRANSMISSION OF A HYBRID AUTOMATIC REPEAT REQUEST ACKNOWLEDGMENT CODEBOOK

(71) Applicant: QUALCOMM Incorporated, San Diego, CA (US)

(72) Inventors: Wei Yang, San Diego, CA (US); Yi Huang, San Diego, CA (US); Seyedkianoush Hosseini, San Diego, CA (US); Kazuki Takeda, Tokyo (JP); Lai Wei, Longmont, CO (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 17/815,787

(22) Filed: Jul. 28, 2022

(65) Prior Publication Data

US 2023/0045695 A1 Feb. 9, 2023

Related U.S. Application Data

(60) Provisional application No. 63/203,977, filed on Aug. 5, 2021.

(51) Int. Cl.
*H04L 1/1812* (2023.01)
*H04L 5/00* (2006.01)

(52) U.S. Cl.
CPC .......... *H04L 1/1812* (2013.01); *H04L 5/0078* (2013.01)

(58) Field of Classification Search
None
See application file for complete search history.

(56) References Cited

U.S. PATENT DOCUMENTS

| | | | |
|---|---|---|---|
| 2022/0015187 A1* | 1/2022 | Huang | H04W 72/1268 |
| 2022/0159692 A1* | 5/2022 | Lee | H04L 5/0053 |
| 2022/0377773 A1* | 11/2022 | Wang | H04W 72/0446 |
| 2023/0006776 A1* | 1/2023 | Yang | H04L 1/00 |
| 2024/0039660 A1* | 2/2024 | Zeng | H04L 1/1861 |

OTHER PUBLICATIONS

Huawei, et al., "UCI Enhancements for URLLC", 3GPP TSG RAN WG1 Meeting #97, R1-1906058, 3rd Generation Partnership Project, Mobile Competence Centre, 650, Route Des Lucioles, F-06921 Sophia-Antipolis Cedex, France, vol. RAN WG1, May 4, 2019, pp. 1-10, XP051708100, pp. 3,4, figure 2.

(Continued)

*Primary Examiner* — Xavier S Wong
(74) *Attorney, Agent, or Firm* — Harrity & Harrity, LLP

(57) ABSTRACT

Various aspects of the present disclosure generally relate to wireless communication. In some aspects, a user equipment (UE) may receive one or more of an indication of a set of timing offset values associated with a hybrid automatic repeat request acknowledgment (HARQ-ACK) codebook or information associated with a set of start and length indicator values (SLIVs) for candidate data channels associated with the HARQ-ACK codebook. The UE may transmit the HARQ-ACK codebook, the HARQ-ACK codebook being based at least in part on one or more of distinct values of the set of timing offset values or distinct values of the set of SLIVs. Numerous other aspects are described.

30 Claims, 9 Drawing Sheets

(56) References Cited

OTHER PUBLICATIONS

International Search Report and Written Opinion—PCT/US2022/074336—ISA/EPO—Nov. 18, 2022.
LG Electronics: "PDSCH/PUSCH Enhancements to Support NR above 52.6 GHz", 3GPP TSG RAN WG1 #104b-e, R1-2103343, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, 22 Pages, Apr. 7, 2021, XP052178098, Section HARQ operation, pp. 5,6, figure 1.

\* cited by examiner

TRANSMISSION OF A HYBRID AUTOMATIC REPEAT REQUEST ACKNOWLEDGMENT CODEBOOK

CROSS-REFERENCE TO RELATED APPLICATION

This patent application claims priority to U.S. Provisional Patent Application No. 63/203,977, filed on Aug. 5, 2021, entitled "TRANSMISSION OF A HYBRID AUTOMATIC REPEAT REQUEST ACKNOWLEDGMENT CODEBOOK," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for transmission of a hybrid automatic repeat request acknowledgment codebook.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving one or more of an indication of a set of timing offset values associated with a hybrid automatic repeat request acknowledgment (HARQ-ACK) codebook or information associated with a set of start and length indicator values (SLIVs) for candidate data channels associated with the HARQ-ACK codebook. The method may include transmitting the HARQ-ACK codebook, the HARQ-ACK codebook being based at least in part on one or more of distinct values of the set of timing offset values or distinct values of the set of SLIVs.

Some aspects described herein relate to a method of wireless communication performed by a network node. The method may include transmitting one or more of an indication of a set of timing offset values associated with a HARQ-ACK codebook or information associated with a set of SLIVs for candidate data channels associated with the HARQ-ACK codebook. The method may include receiving the HARQ-ACK codebook, the HARQ-ACK codebook being based at least in part on one or more of distinct values of the set of timing offset values or distinct values of the set of SLIVs.

Some aspects described herein relate to a UE for wireless communication. The user equipment may include a memory and one or more processors coupled to the memory. The one or more processors may be configured to receive one or more of an indication of a set of timing offset values associated with a HARQ-ACK codebook or information associated with a set of SLIVs for candidate data channels associated with the HARQ-ACK codebook. The one or more processors may be configured to transmit the HARQ-ACK codebook, the HARQ-ACK codebook being based at least in part on one or more of distinct values of the set of timing offset values or distinct values of the set of SLIVs.

Some aspects described herein relate to a network node for wireless communication. The network node may include a memory and one or more processors coupled to the memory. The one or more processors may be configured to transmit one or more of an indication of a set of timing offset values associated with a HARQ-ACK codebook or information associated with a set of SLIVs for candidate data channels associated with the HARQ-ACK codebook. The one or more processors may be configured to receive the HARQ-ACK codebook, the HARQ-ACK codebook being based at least in part on one or more of distinct values of the set of timing offset values or distinct values of the set of SLIVs.

Some aspects described herein relate to a non-transitory computer-readable medium that stores a set of instructions for wireless communication by a UE. The set of instructions, when executed by one or more processors of the UE, may cause the UE to receive one or more of an indication of a set of timing offset values associated with a HARQ-ACK codebook or information associated with a set of SLIVs for candidate data channels associated with the HARQ-ACK codebook. The set of instructions, when executed by one or more processors of the UE, may cause the UE to transmit the HARQ-ACK codebook, the HARQ-ACK codebook being based at least in part on one or more of distinct values of the set of timing offset values or distinct values of the set of SLIVs.

Some aspects described herein relate to a non-transitory computer-readable medium that stores a set of instructions for wireless communication by a network node. The set of instructions, when executed by one or more processors of the network node, may cause the network node to transmit one or more of an indication of a set of timing offset values associated with a HARQ-ACK codebook or information associated with a set of SLIVs for candidate data channels associated with the HARQ-ACK codebook. The set of instructions, when executed by one or more processors of the network node, may cause the network node to receive the HARQ-ACK codebook, the HARQ-ACK codebook being based at least in part on one or more of distinct values of the set of timing offset values or distinct values of the set of SLIVs.

Some aspects described herein relate to an apparatus for wireless communication. The apparatus may include means for receiving one or more of an indication of a set of timing offset values associated with a HARQ-ACK codebook or information associated with a set of SLIVs for candidate data channels associated with the HARQ-ACK codebook. The apparatus may include means for transmitting the HARQ-ACK codebook, the HARQ-ACK codebook being based at least in part on one or more of distinct values of the set of timing offset values or distinct values of the set of SLIVs.

Some aspects described herein relate to an apparatus for wireless communication. The apparatus may include means for transmitting one or more of an indication of a set of timing offset values associated with a HARQ-ACK codebook or information associated with a set of SLIVs for candidate data channels associated with the HARQ-ACK codebook. The apparatus may include means for receiving the HARQ-ACK codebook, the HARQ-ACK codebook being based at least in part on one or more of distinct values of the set of timing offset values or distinct values of the set of SLIVs.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
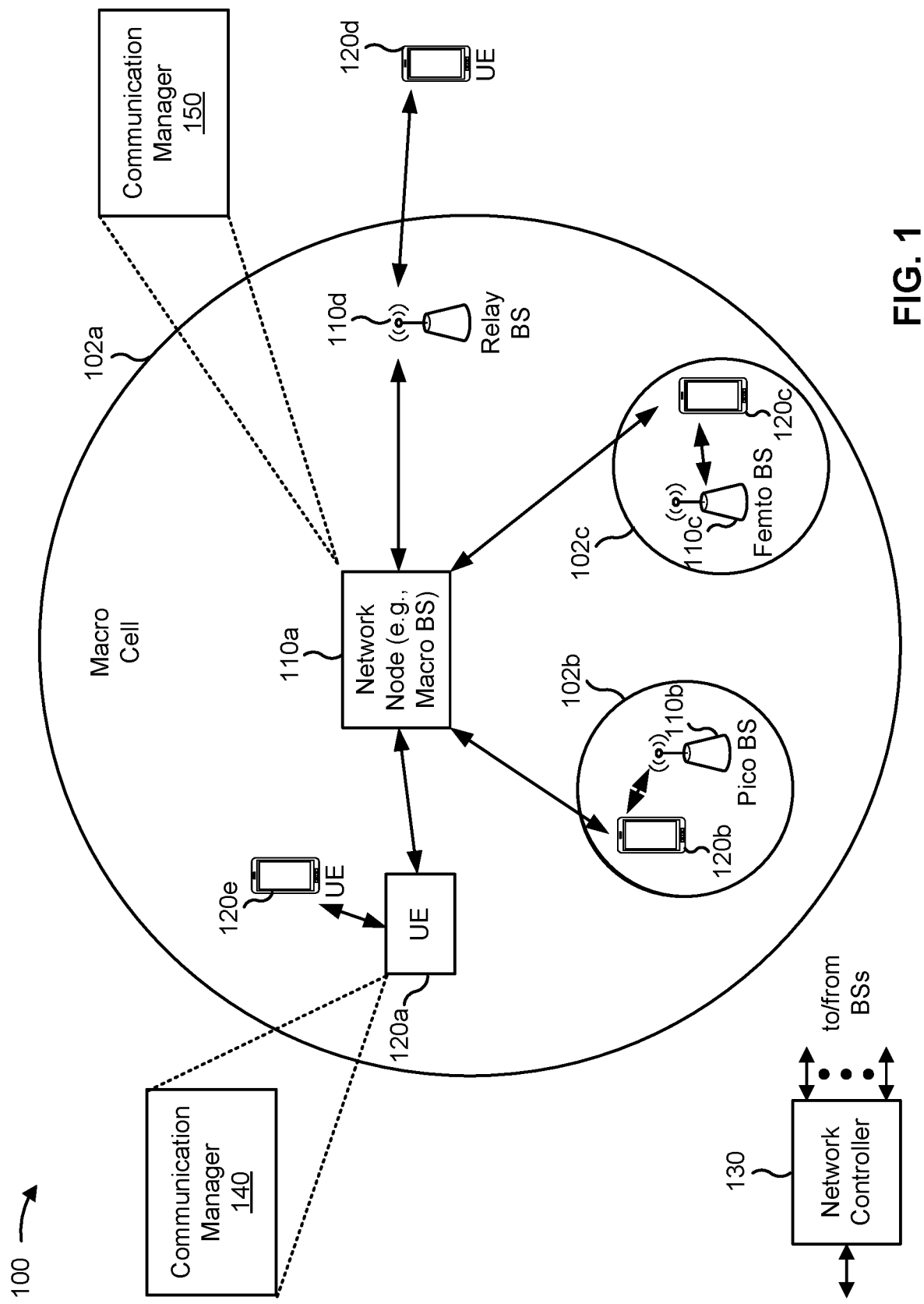
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A network node 110 is an entity that communicates with UEs 120. A network node 110 (sometimes referred to as a BS) may include, for example, an NR base station, an LTE base station, a Node B, an eNB (e.g., in 4G), a gNB (e.g., in 5G), an access point, and/or a transmission reception point (TRP). Each network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used.

A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro base station. A network node 110 for a pico cell may be referred to as a pico base station. A network node 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A network node may support one or multiple (e.g., three) cells.

In some examples, a cell may not necessarily be stationary, and the geographic area of the cell may move according to the location of a network node 110 that is mobile (e.g., a mobile network node). In some examples, the network nodes 110 may be interconnected to one another and/or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a network node 110 or a UE 120) and send a transmission of the data to a downstream station (e.g., a UE 120 or a network node 110). A relay station may be a UE 120 that can relay transmissions for other UEs 120. In the example shown in FIG. 1, the BS 110d (e.g., a relay network node) may communicate with the BS 110a (e.g., a macro network node) and the UE 120d in order to facilitate communication between the BS 110a and the UE 120d. A network node 110 that relays communications may be referred to as a relay station, a relay network node, a relay, or the like.

The wireless network 100 may be a heterogeneous network that includes network nodes 110 of different types, such as macro base stations, pico base stations, femto base stations, relay base stations, or the like. These different types of network nodes 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

In some aspects, the UE 120 may include a communication manager 140. As described in more detail elsewhere herein, the communication manager 140 may receive one or more of an indication of a set of timing offset values associated with a hybrid automatic repeat request (HARQ)-acknowledgement (ACK) (HARQ-ACK) codebook or information associated with a set of SLIVs for candidate data channels associated with the HARQ-ACK codebook; and transmit the HARQ-ACK codebook, the HARQ-ACK codebook being based at least in part on one or more of distinct values of the set of timing offset values or distinct values of the set of SLIVs. Additionally, or alternatively, the communication manager 140 may perform one or more other operations described herein.

In some aspects, the network node 110 may include a communication manager 150. As described in more detail elsewhere herein, the communication manager 150 may transmit one or more of an indication of a set of timing offset values associated with a HARQ-ACK codebook or information associated with a set of SLIVs for candidate data channels associated with the HARQ-ACK codebook; and receive the HARQ-ACK codebook, the HARQ-ACK codebook being based at least in part on one or more of distinct values of the set of timing offset values or distinct values of the set of SLIVs. Additionally, or alternatively, the communication manager 150 may perform one or more other operations described herein.

As indicated above, FIG. 1 is provided as an example. Other examples may differ from what is described with regard to FIG. 1.

Figure 2:
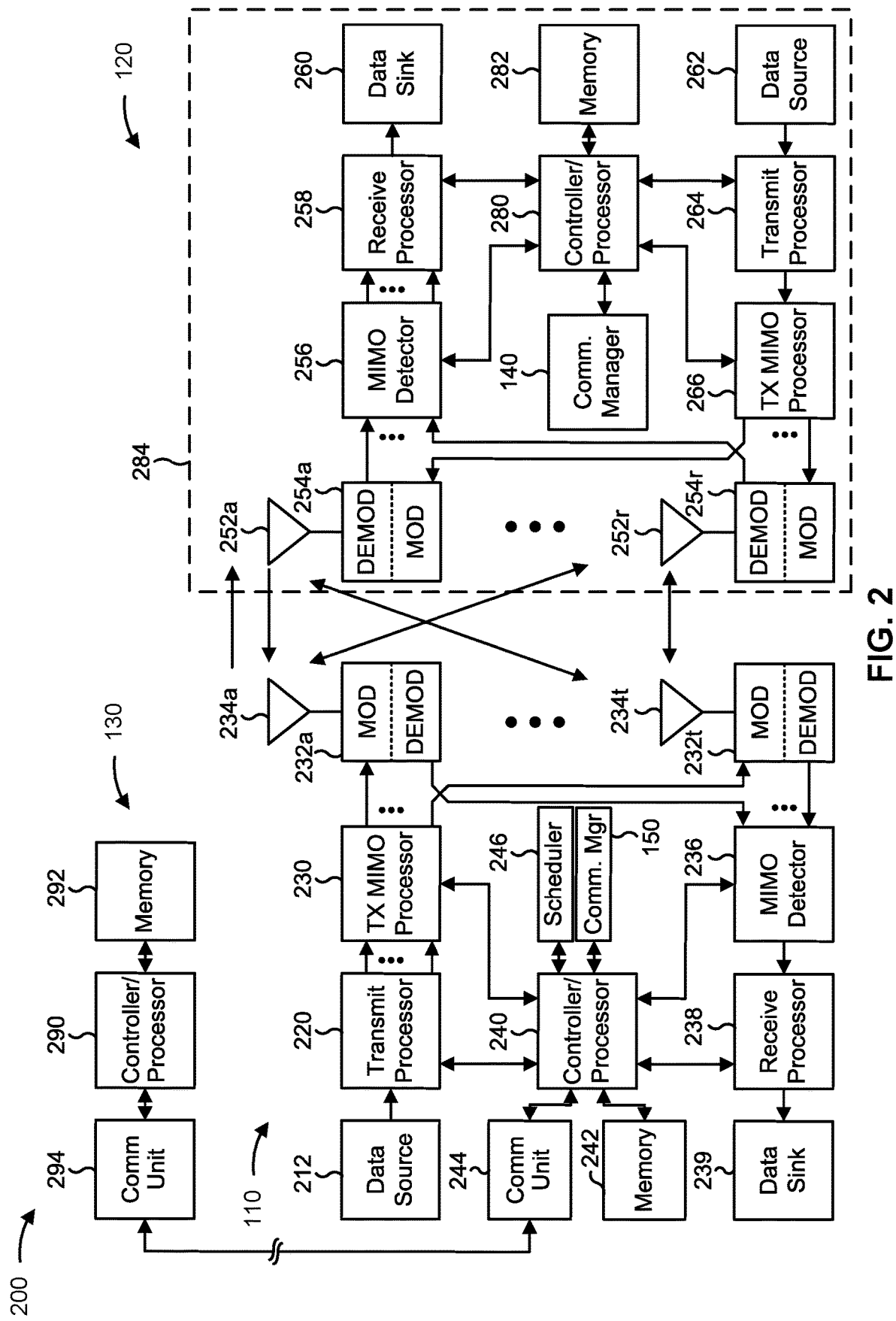
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1).

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the network node 110, the controller/processor 280 of the UE 120, and/or any other component(s) of FIG. 2 may perform one or more techniques associated with transmission of a hybrid automatic repeat request acknowledgment codebook, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for receiving one or more of an indication of a set of timing offset values associated with a HARQ-ACK codebook or information associated with a set of SLIVs for candidate data channels associated with the HARQ-ACK codebook; and/or means for transmitting the HARQ-ACK codebook, the HARQ-ACK codebook being based at least in part on one or more of distinct values of the set of timing offset values or distinct values of the set of SLIVs. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting one or more of an indication of a set of timing offset values associated with a HARQ-ACK codebook or information associated with a set of SLIVs for candidate data channels associated with the HARQ-ACK codebook; and/or means for receiving the HARQ-ACK codebook, the HARQ-ACK codebook being based at least in part on one or more of distinct values of the set of timing offset values or distinct values of the set of SLIVs. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
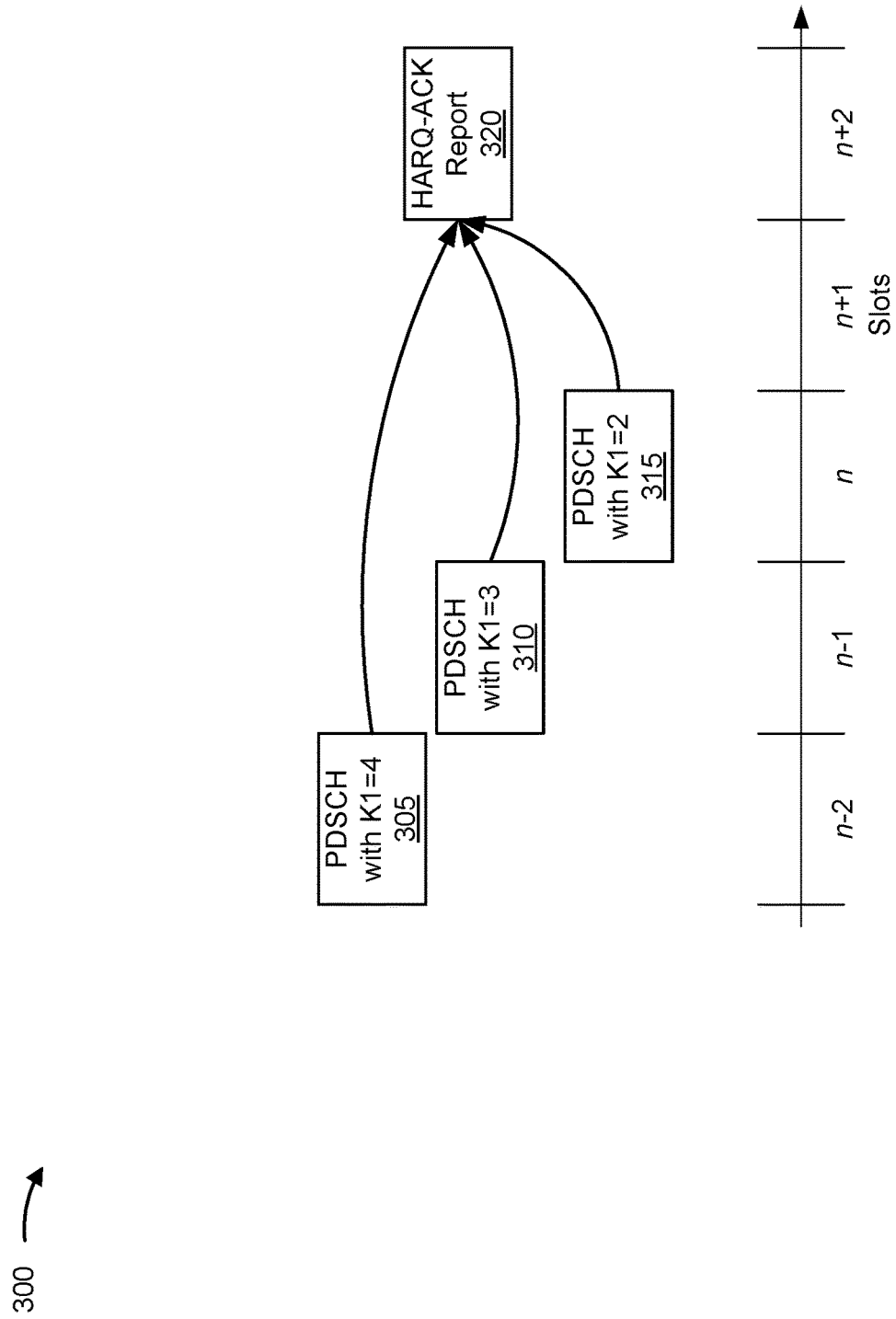
FIG. 3 is a diagram illustrating an example of timing offset values, in accordance with the present disclosure.

FIG. 3 is a diagram illustrating an example 300 of timing offset values, in accordance with the present disclosure. As shown in FIG. 3, a network node may communicate with a UE via one or more physical downlink shared channel (PDSCH) communications and/or a HARQ-ACK report (e.g., via a physical uplink control channel (PUCCH) communication). In some aspects, the network node and the UE may be part of a wireless network. The UE and the network node may have established a wireless connection prior to operations shown in FIG. 3.

As shown in FIG. 3, the network node may transmit, and the UE may receive, a PDSCH communication 305 with a timing offset value (K1 value) of 4. The timing offset value indicates a number of slots until the UE is to transmit a HARQ-ACK for the PDSCH communication 305. For example, the UE receives the PDSCH communication 305 during slot n−2 and the timing offset value of 4 indicates that the UE is scheduled to transmit the HARQ-ACK during slot n+2.

The network node may transmit, and the UE may receive, a PDSCH communication 310 with a timing offset value (K1 value) of 3. Based at least in part on the UE receiving the PDSCH communication 310 during slot n−1, the UE is scheduled to transmit the HARQ-ACK during slot n+2.

The network node may transmit, and the UE may receive, a PDSCH communication 315 with a timing offset value (K1 value) of 2. Based at least in part on the UE receiving the PDSCH communication 315 during slot n, the UE is scheduled to transmit the HARQ-ACK during slot n+2.

The UE may be configured to transmit the HARQ-ACKs for all three PDSCH communications during the slot n+2 using a Type 1 HARQ-ACK codebook (e.g., a HARQ-ACK codebook having a fixed size that is preconfigured and/or semi-statically configured). To generate the HARQ-ACK codebook for transmission as a HARQ-ACK report 320, the UE determines a set of candidate data channels based at least in part on a set of timing offset values (e.g., slot timing values K1) associated with an active uplink bandwidth part. If the UE is configured to monitor PDCCH for downlink control information (DCI) format 1_0 and is not configured to monitor a physical downlink control channel (PDCCH) for either DCI format 1_1 or DCI format 1_2 on a serving cell c, the set of timing offset values includes, for example, {1, 2, 3, 4, 5, 6, 7, 8}. If the UE is configured to monitor a PDCCH for DCI format 1_1 and is not configured to monitor the PDCCH for DCI format 1_2 for serving cell c, the set of timing offset values is indicated by a first parameter (e.g., dl-DataToUL-ACK). If the UE is configured to monitor a PDCCH for DCI format 1_2 and is not configured to monitor the PDCCH for DCI format 1_1 for serving cell c, the set of timing offset values is provided by a second parameter (e.g., dl-DataToUL-ACK-ForDCIFormat1_2). If the UE is configured to monitor PDCCH for DCI format 1_1 and DCI format 1_2 for serving cell c, the set of timing offset values is provided by the union of the first parameter and the second parameter. The union of the first parameter and the second parameter may form a data set with repeated values.

As indicated above, FIG. 3 is provided as an example. Other examples may differ from what is described with regard to FIG. 3.

Figure 4:
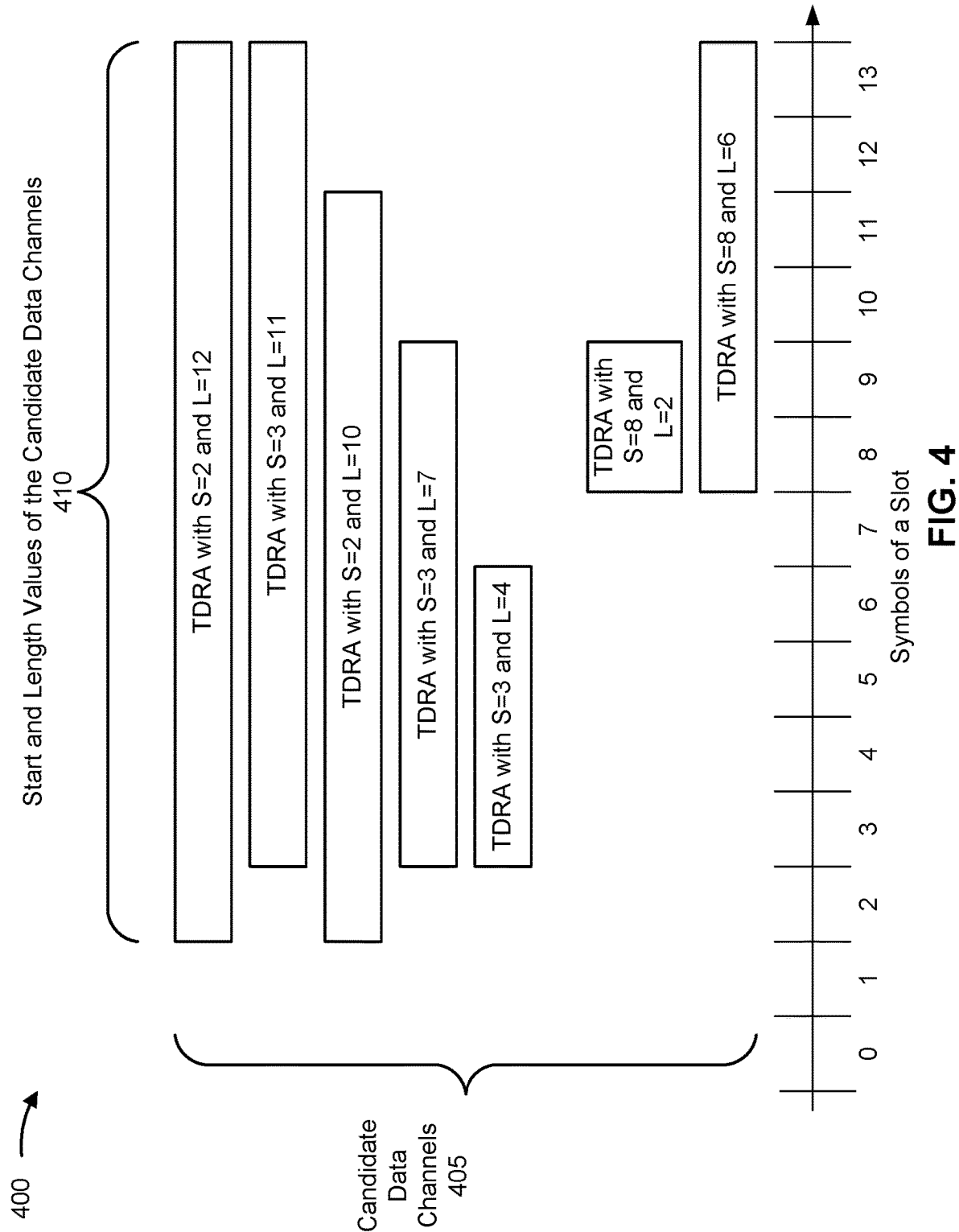
FIG. 4 is a diagram illustrating an example of start and length values for candidate data channels, in accordance with the present disclosure.

FIG. 4 is a diagram illustrating an example 400 of start and length values for candidate data channels, in accordance with the present disclosure. As shown in FIG. 4, a network node may communicate with a UE via one or more candidate data channels (e.g., PDSCH channels). In some aspects, the network node and the UE may be part of a wireless network. The UE and the network node may have established a wireless connection prior to operations shown in FIG. 4.

As shown in FIG. 4, the UE may be configured with a set of candidate data channels 405 for a slot. FIG. 4 further shows start and length values 410 of the candidate data channels 405 during a slot. For example, each candidate data channel 405 may be indicated by a time domain resource allocation (TDRA) with a start value, associated with a symbol of the slot during which an associated candidate data channel 405 begins, and a length value that indicates a number of symbols over which the associated candidate data channel 405 extends. As shown in FIG. 4, a candidate data channel 405 having a start value of 2 and a length value of 12 extends, in the time domain, from symbol 2 through to symbol 13 of the slot. A candidate data channel 405 having a start value of 3 and a length value of 11 extends, in the time domain, from symbol 3 through symbol 13 of the slot. A candidate data channel 405 having a start value of 2 and a length value of 10 extends, in the time domain, from symbol 2 through symbol 11 of the slot. A candidate data channel 405 having a start value of 3 and a length value of 7 extends, in the time domain, from symbol 3 through symbol 9 of the slot. A candidate data channel 405 having a start value of 3 and a length value of 4 extends, in the time domain, from symbol 3 through symbol 6 of the slot. A candidate data channel 405 having a start value of 8 and a length value of 2 extends, in the time domain, from symbol 8 through symbol 9 of the slot. A candidate data channel 405 having a start value of 8 and a length value of 6 extends, in the time domain, from symbol 8 through symbol 13 of the slot.

Within a slot, the UE may identify all TDRAs, associated with candidate data channels 405, for a cell. Based at least in part on the TDRAs, the UE may determine a maximum number of non-overlapping candidate data channels 405 that may be scheduled within a slot and assign a number of HARQ-ACK bits based at least in part on the maximum number of non-overlapping candidate data channels 405. For example, in FIG. 4, the maximum number of non-overlapping candidate data channels 405 is 2 based at least in part the candidate data channel 405 having a start value of 3 and a length value of 4 being combinable with either of the candidate data channel 405 having a start value of 8 and a length value of 2 or the candidate data channel 405 having a start value of 8 and a length value of 6.

In some networks, the UE may be configured to determine a number of HARQ-ACK bits and to map each candidate data channel 405 to a HARQ-ACK bit. For a subset of the candidate data channels 405 that are mapped to the same HARQ-ACK bit, at most one candidate data channel 405 may be used to scheduled a PDSCH.

A set of TDRAs and/or candidate data channels 405 may be determined based at least in part on an indication in one or more parameters (e.g., pdsch-TimeDomainAllocationList and/or pdsch-TimeDomainAllocationListDCI-1-2-r16, among other examples) or may be determined based at least in part on a configuration within a communication protocol.

As indicated above, FIG. 3 is provided as an example. Other examples may differ from what is described with regard to FIG. 3.

As described herein, a set of timing offset values may include redundancies (e.g., repeated values) and/or a set of candidate data channels may include redundancies. In a first example, a parameter that provides timing offset values (e.g., dl-DataToUL-ACK or dl-DataToUL-ACK-ForDCI-Format1_2) indicate non-distinct values, (e.g., a set that includes {1,2,3,3,3,4,4}). In a second example, multiple parameters that provide timing offset values (e.g., dl-Data-ToUL-ACK and dl-DataToUL-ACK-ForDCIFormat1_2) are configured, and they contain shared values (e.g., a first subset of values of {1,2,3} and a second set of values of {2,3,4,5,6}). In the second example, a union (e.g., direct union) of the multiple parameters (e.g., radio resource control (RRC) parameters) will contain repetitive values, (e.g., a combined set of values of {1,2,3,2,3,4,5,6}). In a third example, an indication of a set of SLIVs for candidate data channels (e.g., a pdsch-TimeDomainAllocationList or pdsch-TimeDomainAllocationListDCI-1-2-r16) contains entries with repetitive SLIVs. For example, each entry a set of TDRAs may include information about "slot offsets K0, and/or start and length indicators SLIV." Two entries may have a same SLIV and different K0 values. In this case, the set of SLIVs determined from the indication of the set of SLIVs (e.g., pdsch-TimeDomainAllocationList or pdsch-TimeDomainAllocationListDCI-1-2-r16) may include repetitive SLIVs. In a fourth example, an indication of a set of SLIVs for candidate data channels (e.g., a pdsch-TimeDomainAllocationList or pdsch-TimeDomainAllocation-ListDCI-1-2-r16) includes entries with the same SLIV. For example, the indication of the set of SLIVs may indicate multiple SLIVs for different slots, which may result in repeated values in the set of SLIVs.

Based at least in part on having repetitive timing offset values and/or repetitive SLIV values, an associated HARQ-ACK codebook may have repetitive bits (e.g., multiple bits mapped to a same candidate data channel with a same indication), which may unnecessarily consume communication, network, power, and/or computing resources to communicate the repetitive bits. Additionally, or alternatively, the network node and the UE may not be synchronized regarding whether to include the repetitive bits, which may cause the network node to misinterpret the HARQ-ACK codebook. Based at least in part on the network node misinterpreting the HARQ-ACK codebook, the network node may re-transmit a communication that is misinterpreted to be not received by the UE or the network node my fail to re-transmit a communication that is misinterpreted to be received by the UE. The network node and/or the UE may consume communication, network, power, and/or computing resources to detect and/or correct these communication errors.

In some aspects described herein, a UE may receive an indication of a set of timing offset values associated with a HARQ-ACK codebook and/or information associated with a set of SLIVs for candidate data channels associated with the HARQ-ACK-codebook. The UE may generate (e.g., construct and/or determine) the HARQ-ACK codebook (e.g., a Type 1 HARQ-ACK codebook) using a set of distinct (e.g., non-repeated) timing offset values (e.g., from parameters such as dl-DataToUL-ACK and/or dl-DataToUL-ACK-ForDCIFormat1_2) and/or using a set of distinct SLIV values for each slot of respective slots determined from a set of {n-K1}. For example, the UE may identify and/or remove repetitive timing offset values from the set of timing offset values and/or may identify and/or remove repetitive SLIV values from a union of row indexes of TDRA tables for DCI formats that the UE is configured to monitor for a PDCCH associated with a serving cell.

In some aspects, a network node may be configured to transmit parameters (e.g., dl-DataToUL-ACK and/or dl-DataToUL-ACK-ForDCIFormat1_2) that do not include repetitive timing offset values and/or to indicate SLIV values (e.g., using pdsch-TimeDomainAllocationList or pdsch-TimeDomainAllocationListDCI-1-2-r16) that do not indicated repetitive SLIV values.

In some aspects, the network node and the UE may communicate to synchronize whether repetitive SLIV values and/or repetitive timing offset values should be removed for generating a HARQ-ACK codebook.

Based at least in part on removing repetitive timing offset values and/or repetitive SLIV values, an associated HARQ-ACK codebook may not have repetitive bits (e.g., multiple bits mapped to a same candidate data channel with a same indication), which may conserve communication, network, power, and/or computing resources. Additionally, or alternatively, the network node and the UE may be synchronized regarding whether to include the repetitive bits, which may reduce misinterpretations of the HARQ-ACK codebook by the network node. Based at least in part on the network node correctly interpreting the HARQ-ACK codebook, the network node may avoid re-transmitting communications that may have otherwise been misinterpreted as not having been received by the UE and the network node my re-transmit a communication that may have otherwise been misinterpreted as being received by the UE. The network node and/or the UE may conserve communication, network, power, and/or computing resources that may have otherwise been consumed to detect and/or correct communication errors associated with misinterpretations of the HARQ-ACK codebook.

Figure 5:
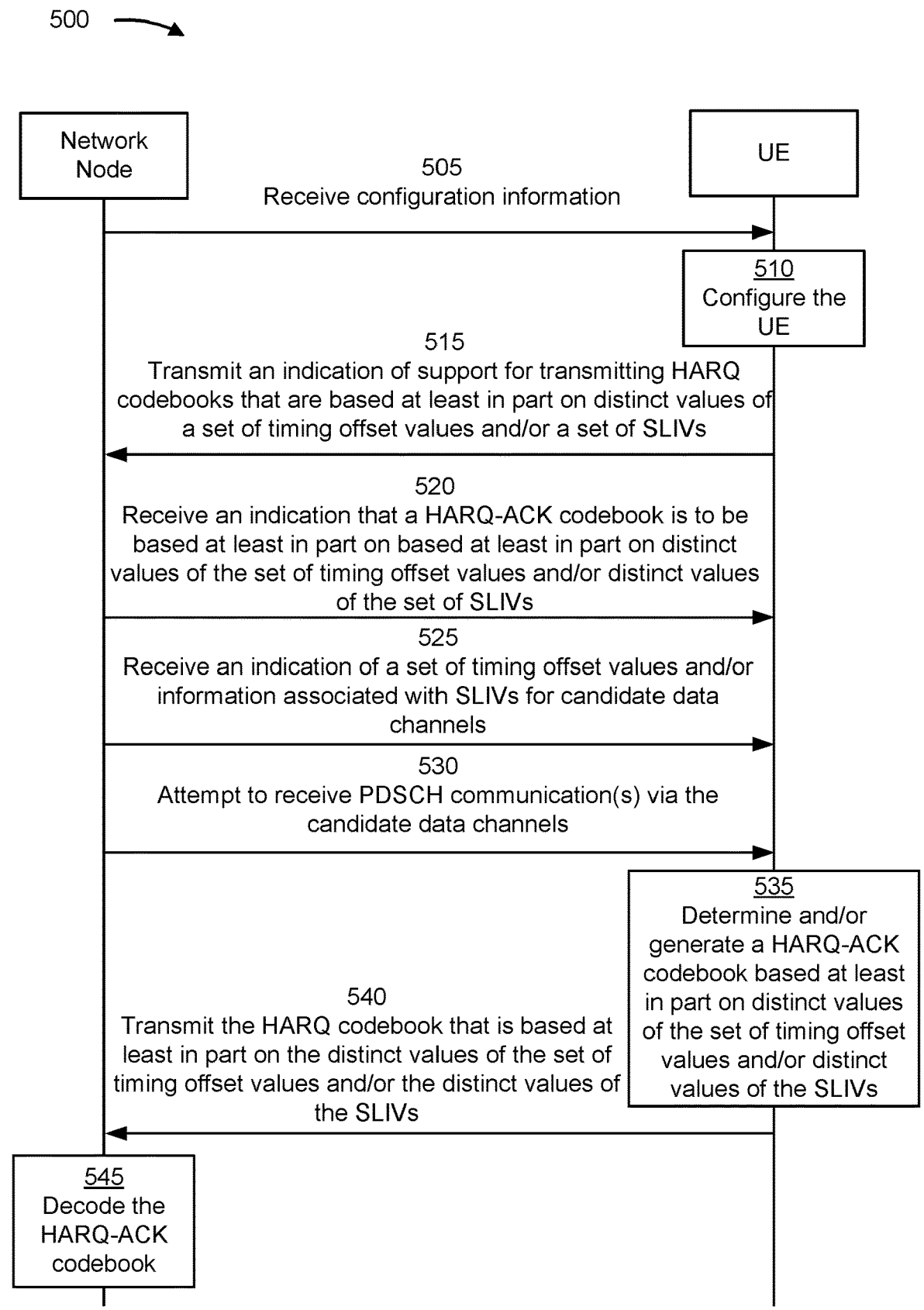
FIG. 5 is a diagram illustrating an example associated with transmission of a hybrid automatic repeat request acknowledgment codebook, in accordance with the present disclosure.

FIG. 5 is a diagram illustrating an example 500 associated with transmission of a HARQ-ACK codebook, in accordance with the present disclosure. As shown in FIG. 5, a network node (e.g., network node 110) may communicate with a UE (e.g., UE 120). In some aspects, the network node and the UE may be part of a wireless network (e.g., wireless network 100). The UE and the network node may have established a wireless connection prior to operations shown in FIG. 5.

As shown by reference number 505, the network node may transmit, and the UE may receive, configuration information. In some aspects, the UE may receive the configuration information via one or more of RRC signaling, MAC CEs, and/or DCI, among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit an indication of support for transmitting HARQ-ACK codebooks that are based at least in part on distinct values of timing offset values and/or distinct values of SLIVs. In some aspects, the configuration information may indicate that the UE is to transmit HARQ-ACK codebooks that are based at least in part on distinct values of timing offset values and/or distinct values of SLIVs for communications with the network node.

As shown by reference number 510, the UE may configure the UE based at least in part on the configuration information. In some aspects, the UE may be configured to perform one or more operations described herein based at least in part on the configuration information.

As shown by reference number 515, the UE may transmit, and the network node may receive, an indication of support for transmitting HARQ-ACK codebooks that are based at least in part on distinct values of timing offset values and/or distinct values of a set of SLIVs. In some aspects, the UE may transmit the indication of support via RRC signaling (e.g., as part of an RRC connection process).

As shown by reference number 520, the UE may receive, and the network node may transmit, an indication that a HARQ-ACK codebook is to be based at least in part on based at least in part on distinct values of the set of timing offset values and/or distinct values of the set of SLIVs. In some aspects, the UE may receive the indication within an RRC communication, with the indication to be applied to one or more HARQ-ACK codebooks. For example, the indication may be associated with a time duration, a number of HARQ-ACK codebook transmissions, a semi-persistent scheduling-based set of scheduling grants, and/or a bandwidth part, among other examples. Additionally, or alternatively, the UE may receive the indication via dynamically signaling, such as a resource grant (e.g., DCI).

As shown by reference number 525, the UE may receive, and the network node may transmit, an indication of a set of timing offset values and/or information associated with SLIVs for candidate data channels. For example, the UE may receive the indication and/or the information via RRC signaling and/or via a scheduling grant. In some aspects, the set of timing offset values and/or the set of SLIVs include repetitive values (e.g., repeating and/or redundant, among other examples) that map to a same HARQ-ACK codebook. For example, the repetitive values may be mapped to a HARQ-ACK indication associated with a same data channel communication (e.g., associated with a same candidate data channel).

In some aspects, the indication of the set of timing offset values may include one or more RRC-based parameters (e.g., dl-DataToUL-ACK and/or dl-DataToUL-ACK-ForDCIFormat1_2). The set of timing offset values may be based at least in part on a union of a first subset of timing offset values (e.g., associated with a first parameter of the one or more RRC-based parameters) and a second subset of timing offset values (e.g., associated with a second parameter of the one or more RRC-based parameters). In some aspects, the information associated with the set of SLIVs may include one or more RRC-based parameters (e.g., using pdsch-TimeDomainAllocationList or pdsch-TimeDomain-AllocationListDCI-1-2-r16). The set of SLIVs may be based at least in part on a union of a third subset of SLIVs (e.g., associated with a third parameter of the one or more RRC-based parameters) and a fourth subset of SLIVs (e.g., associated with a fourth parameter of the one or more RRC-based parameters).

As shown by reference number 530, the network node may transmit, and the UE may attempt to receive, one or more PDSCH communications via the candidate data channels. For example, the UE may monitor one or more candidate data channels in one or more slots, as indicated in a scheduling grant. The UE may attempt to decode signals sampled from the one or more candidate data channels and determine whether the decoding is successful.

As shown by reference number 535, the UE may determine and/or generate a HARQ-ACK codebook based at least in part on distinct values of the set of timing offset values and/or distinct (e.g., non-repeated and/or non-redundant) values of the SLIVs. The UE may determine the HARQ-ACK codebook based at least in part on determining a size of the HARQ-ACK codebook. The size HARQ-ACK codebook may be based at least in part on the distinct values of the set of timing offset values and/or the distinct values of the set of SLIVs. The network node may similarly determine and/or generate the HARQ-ACK codebook (e.g., a size, a number of bits, and/or a mapping to the one or more PDSCH communications, among other examples) expected to be received via the UE.

In some aspects, the UE may generate the HARQ-ACK codebook based at least in part on the distinct values of the set of timing offset values, and/or the distinct values of the set of SLIVs. The distinct values of the set of timing offset values may include fewer values than the set of timing offset values and/or the distinct values of the set of SLIVs includes fewer values than the set of SLIVs. In some aspects, the UE may generate the HARQ-ACK codebook based at least in part on generating values of the distinct values of the set of timing offset values or distinct values of the set of SLIVs. The UE may generate the values of the distinct values of the set of timing offset values or distinct values of the set of SLIVs based at least in part on removing at least one value from the set of timing offset values or the set of SLIVs.

In some aspects, the UE may determine the distinct values of the set of SLIVs from a set of TDRA parameters. In some aspects, a TDRA parameter in the set of TDRA parameters includes a slot parameter and a SLIV. The UE may determine that a first TDRA parameter includes a first slot parameter and a first SLIV and that a second TDRA parameter includes a second slot parameter and the first SLIV. The UE may include the first SLIV only once in the distinct values of the set of SLIVs.

As shown by reference number 540, the UE may transmit, and the network node may receive, the HARQ codebook that is based at least in part on the distinct values of the set of timing offset values and/or the distinct values of the SLIVs. The HARQ-ACK codebook may have a size and/or a format that is based at least in part on the distinct values of the set of timing offset values and/or distinct values of the set of SLIVs.

As shown by reference number 545, the network node may decode the HARQ-ACK codebook based at least in part on an expected of size, an expected number of bits, and/or a mapping to the one or more PDSCH communications. In some aspects, the network node may decode the HARQ-ACK codebook based at least in part on a transmitting user equipment generating the HARQ-ACK codebook based at least in part on the distinct values of the set of timing offset values, and/or the distinct values of the set of SLIVs. For example, the network node may determine the HARQ-ACK codebook (e.g., an expected HARQ-ACK codebook) having a size and/or format (e.g., including a mapping to PDSCH communications) that is based at least in part on the distinct values of the set of timing offset values and/or distinct values of the SLIVs.

As indicated above, FIG. 5 is provided as an example. Other examples may differ from what is described with regard to FIG. 5.

Figure 6:
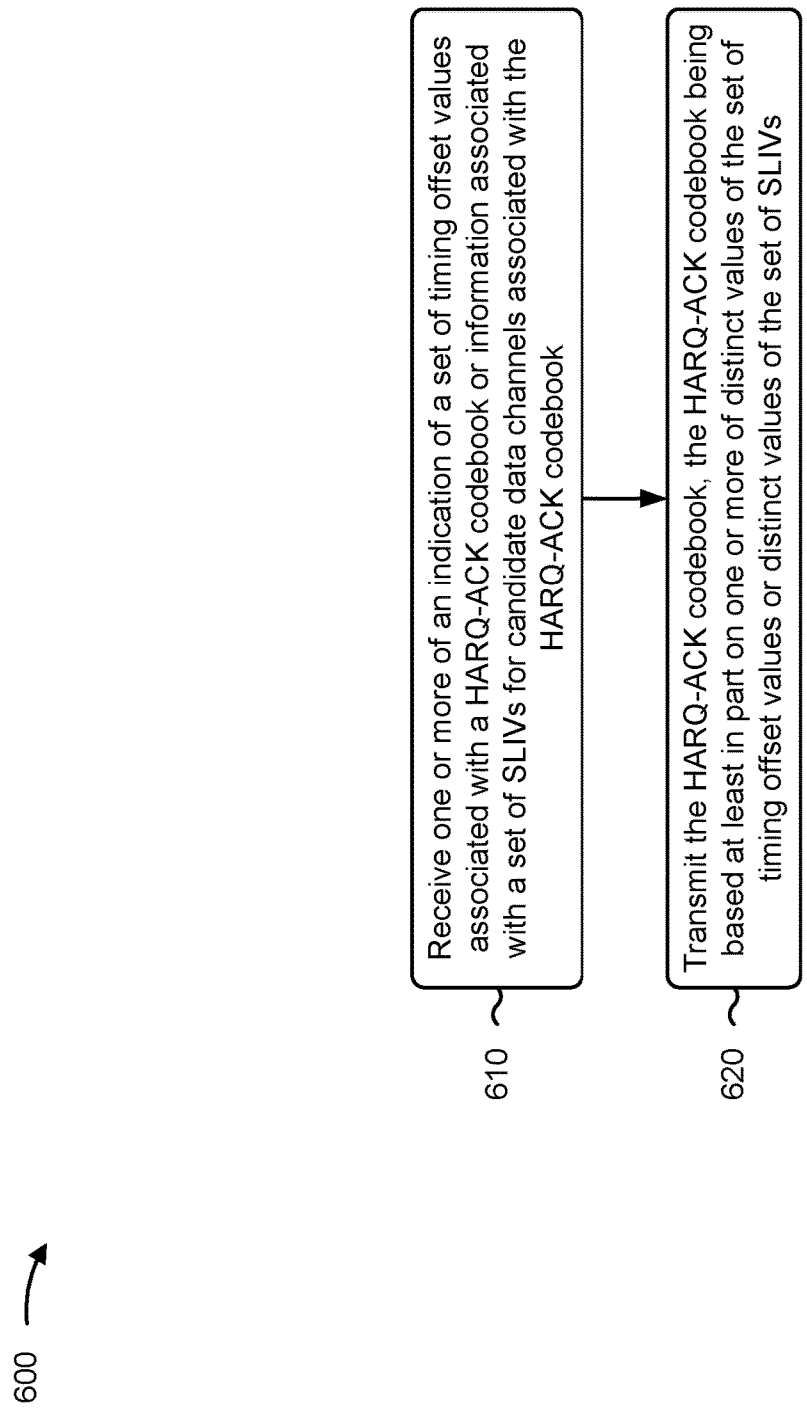
FIGS. 6 and 7 are diagrams illustrating example processes associated with transmission of a hybrid automatic repeat request acknowledgment codebook, in accordance with the present disclosure.

FIG. 6 is a diagram illustrating an example process 600 performed, for example, by a UE, in accordance with the present disclosure. Example process 600 is an example where the UE (e.g., UE 120) performs operations associated with transmission of a HARQ-ACK codebook.

As shown in FIG. 6, in some aspects, process 600 may include receiving one or more of an indication of a set of timing offset values associated with a HARQ-ACK codebook or information associated with a set of SLIVs for candidate data channels associated with the HARQ-ACK codebook (block 610). For example, the UE (e.g., using communication manager 140 and/or reception component 802, depicted in FIG. 8) may receive one or more of an indication of a set of timing offset values associated with a HARQ-ACK codebook or information associated with a set of SLIVs for candidate data channels associated with the HARQ-ACK codebook, as described above.

As further shown in FIG. 6, in some aspects, process 600 may include transmitting the HARQ-ACK codebook, the HARQ-ACK codebook being based at least in part on one or more of distinct values of the set of timing offset values or distinct values of the set of SLIVs (block 620). For example, the UE (e.g., using communication manager 140 and/or transmission component 804, depicted in FIG. 8) may transmit the HARQ-ACK codebook, the HARQ-ACK codebook being based at least in part on one or more of distinct values of the set of timing offset values or distinct values of the set of SLIVs, as described above.

Process 600 may include additional aspects, such as any single aspect or any combination of aspects described below and/or in connection with one or more other processes described elsewhere herein.

In a first aspect, process 600 includes generating the HARQ-ACK codebook based at least in part on one or more of the distinct values of the set of timing offset values, or the distinct values of the set of SLIVs.

In a second aspect, alone or in combination with the first aspect, the distinct values of the set of timing offset values comprise fewer values than the set of timing offset values, or wherein the distinct values of the set of SLIVs comprise fewer values than the set of SLIVs.

In a third aspect, alone or in combination with one or more of the first and second aspects, process 600 includes receiving an indication that the HARQ-ACK codebook is to be based at least in part on one or more of distinct values of the set of timing offset values or distinct values of the set of SLIVs.

In a fourth aspect, alone or in combination with one or more of the first through third aspects, the set of timing offset values is based at least in part on a union of a first subset of timing offset values and a second subset of timing offset values, or wherein the set of SLIVs is based at least in part on a union of a first subset of SLIVs associated with the information and a second subset of SLIVs associated with the information.

In a fifth aspect, alone or in combination with one or more of the first through fourth aspects, the first subset of timing offset values is indicated by first RRC parameter and the second subset of timing offset values is indicated by a second RRC parameter, or wherein the information associated with the first subset of SLIVs is indicated by third RRC parameter and the second subset associated with the information associated with the second subset of SLIVs is indicated by a fourth RRC parameter.

In a sixth aspect, alone or in combination with one or more of the first through fifth aspects, process 600 includes determining the HARQ-ACK codebook.

In a seventh aspect, alone or in combination with one or more of the first through sixth aspects, determining the HARQ-ACK codebook includes determining a size of the HARQ-ACK codebook.

In an eighth aspect, alone or in combination with one or more of the first through seventh aspects, the size of the HARQ-ACK codebook is based at least in part on one or more of the distinct values of the set of timing offset values or the distinct values of the set of SLIVs.

In a ninth aspect, alone or in combination with one or more of the first through eighth aspects, process 600 includes generating values of the distinct values of the set of timing offset values or distinct values of the set of SLIVs based at least in part on removing at least one value from the set of timing offset values or the set of SLIVs.

In a tenth aspect, alone or in combination with one or more of the first through ninth aspects, process 600 includes determining the distinct values of the set of SLIVs from a set of time domain resource allocation parameters, wherein a time domain resource allocation parameter in the set of time domain resource allocation parameters includes a slot parameter and a SLIV.

In an eleventh aspect, alone or in combination with one or more of the first through tenth aspects, process 600 includes determining that a first time domain resource allocation parameter includes a first slot parameter and a first SLIV, determining that a second time domain resources allocation parameter includes a second slot parameter and the first SLIV, and including the first SLIV only once in the distinct values of the set of SLIVs.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
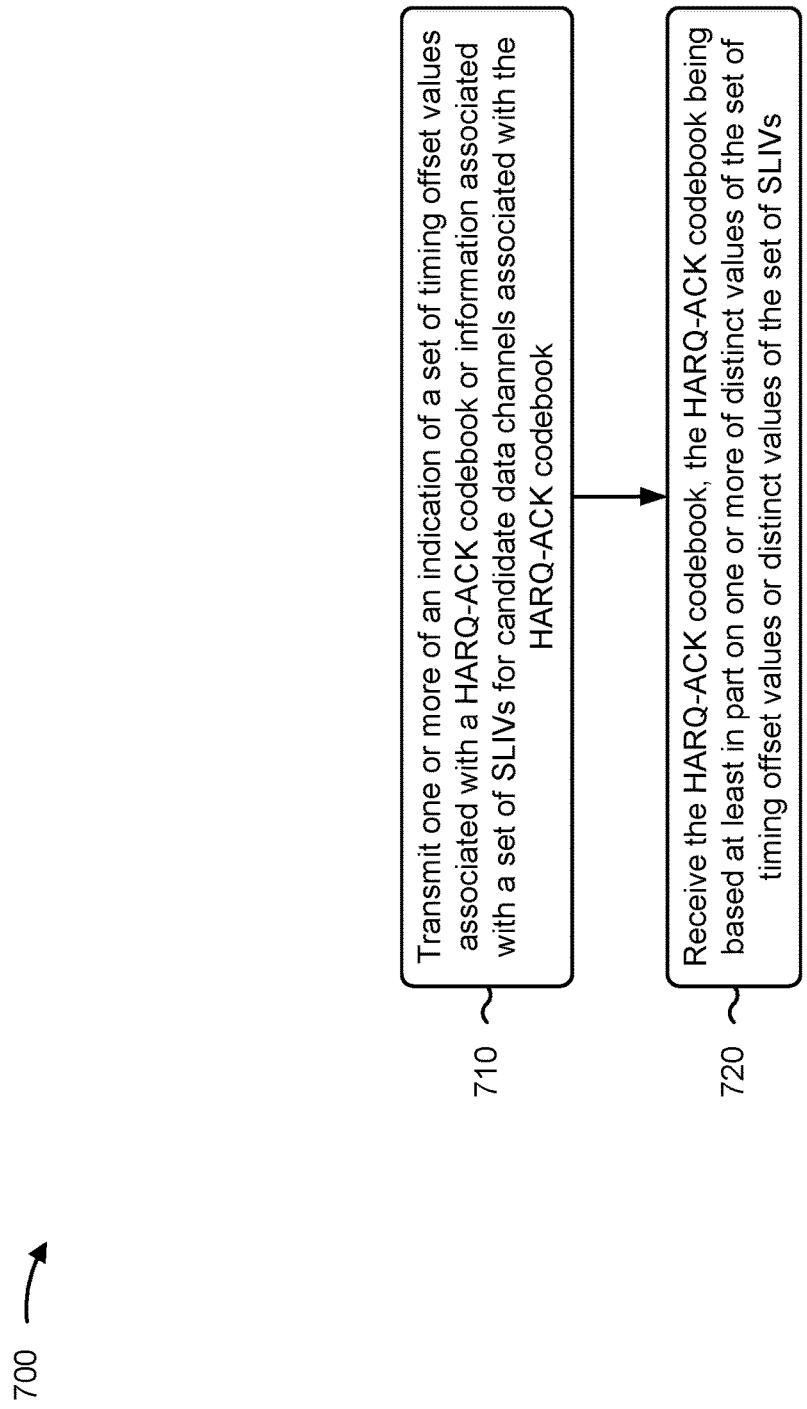

FIG. 7 is a diagram illustrating an example process 700 performed, for example, by a network node, in accordance with the present disclosure. Example process 700 is an example where the network node (e.g., network node 110) performs operations associated with transmission of a HARQ-ACK codebook.

As shown in FIG. 7, in some aspects, process 700 may include transmitting one or more of an indication of a set of timing offset values associated with a HARQ-ACK codebook or information associated with a set of SLIVs for candidate data channels associated with the HARQ-ACK codebook (block 710). For example, the network node (e.g., using communication manager 150 and/or transmission component 904, depicted in FIG. 9) may transmit one or more of an indication of a set of timing offset values associated with a HARQ-ACK codebook or information associated with a set of SLIVs for candidate data channels associated with the HARQ-ACK codebook, as described above.

As further shown in FIG. 7, in some aspects, process 700 may include receiving the HARQ-ACK codebook, the HARQ-ACK codebook being based at least in part on one or more of distinct values of the set of timing offset values or distinct values of the set of SLIVs (block 720). For example, the network node (e.g., using communication manager 150 and/or reception component 902, depicted in FIG. 9) may receive the HARQ-ACK codebook, the HARQ-ACK codebook being based at least in part on one or more of distinct values of the set of timing offset values or distinct values of the set of SLIVs, as described above.

Process 700 may include additional aspects, such as any single aspect or any combination of aspects described below and/or in connection with one or more other processes described elsewhere herein.

In a first aspect, receiving the HARQ-ACK codebook comprises decoding the HARQ-ACK codebook based at least in part on a transmitting user equipment generating the HARQ-ACK codebook based at least in part on one or more of the distinct values of the set of timing offset values, or the distinct values of the set of SLIVs.

In a second aspect, alone or in combination with the first aspect, the distinct values of the set of timing offset values comprises fewer values than the set of timing offset values, or wherein the distinct values of the set of SLIVs comprises fewer values than the set of SLIVs.

In a third aspect, alone or in combination with one or more of the first and second aspects, process 700 includes transmitting an indication that the HARQ-ACK codebook is to be based at least in part on one or more of distinct values of the set of timing offset values or distinct values of the set of SLIVs.

In a fourth aspect, alone or in combination with one or more of the first through third aspects, the set of timing offset values is based at least in part on a union of a first subset of timing offset values and a second subset of timing offset values, or wherein the set of SLIVs is based at least in part on a union of a first subset of SLIVs associated with the information and a second subset of SLIVs associated with the information.

In a fifth aspect, alone or in combination with one or more of the first through fourth aspects, the first subset of timing offset values is indicated by first RRC parameter and the second subset of timing offset values is indicated by a second RRC parameter, or wherein the information associated with the first subset of SLIVs is indicated by third RRC parameter and the second subset associated with the information associated with the second subset of SLIVs is indicated by a fourth RRC parameter.

In a sixth aspect, alone or in combination with one or more of the first through fifth aspects, process 700 includes determining the HARQ-ACK codebook.

In a seventh aspect, alone or in combination with one or more of the first through sixth aspects, determining the HARQ-ACK codebook includes determining a size of the HARQ-ACK codebook.

In an eighth aspect, alone or in combination with one or more of the first through seventh aspects, the size of the HARQ-ACK codebook is based at least in part on one or more of the distinct values of the set of timing offset values or the distinct values of the set of SLIVs.

In a ninth aspect, alone or in combination with one or more of the first through eighth aspects, process 700 includes the distinct values of the set of timing offset values comprise a same number of values than the set of timing offset values, or wherein the distinct values of the set of SLIVs comprise a same number of values than the set of SLIVs.

In a tenth aspect, alone or in combination with one or more of the first through ninth aspects, process 700 includes generating values of the distinct values of the set of timing offset values or distinct values of the set of SLIVs based at least in part on removing at least one value from the set of timing offset values or the set of SLIVs.

In an eleventh aspect, alone or in combination with one or more of the first through tenth aspects, process 700 includes determining the distinct values of the set of SLIVs from a set of time domain resource allocation parameters, wherein a time domain resource allocation parameter in the set of time domain resource allocation parameters includes a slot parameter and a SLIV.

In a twelfth aspect, alone or in combination with one or more of the first through eleventh aspects, process 700 includes determining that a first time domain resource allocation parameter includes a first slot parameter and a first SLIV, determining that a second time domain resources allocation parameters includes a second slot parameter and the first SLIV, and including the first SLIV only once in the distinct values of the set of SLIVs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
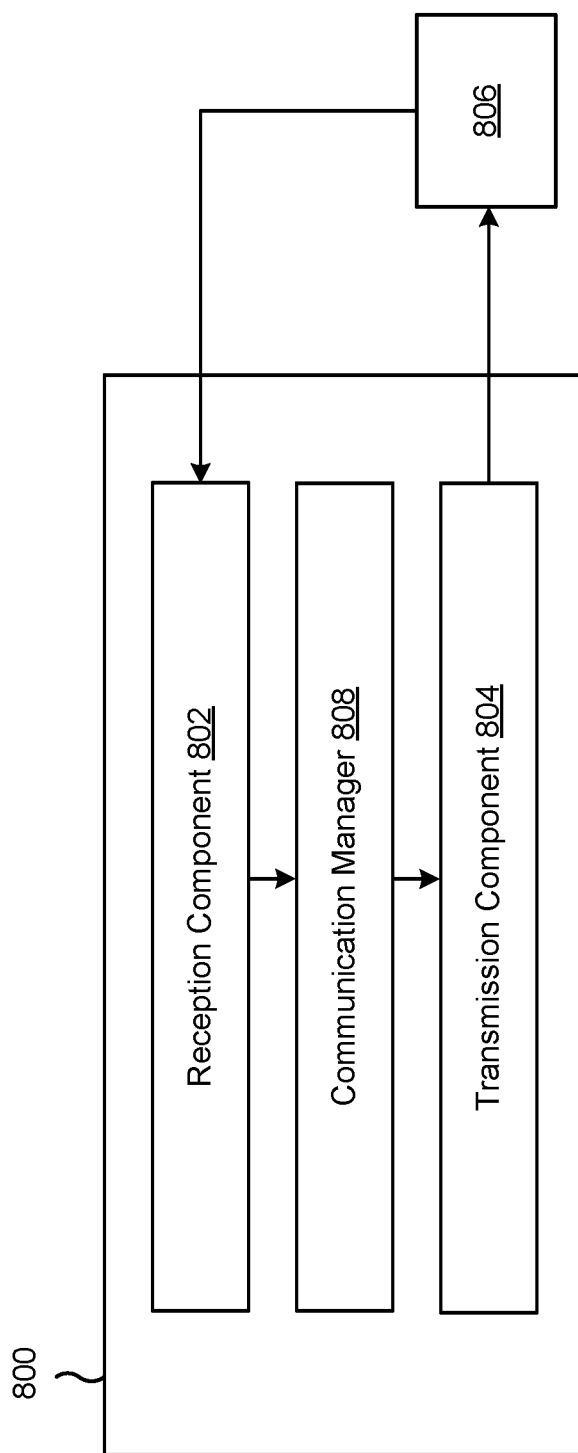
FIGS. 8 and 9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a network node, or another wireless communication device) using the reception component 802 and the transmission component 804. As further shown, the apparatus 800 may include a communication manager 808 (e.g., the communication manager 140).

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive one or more of an indication of a set of timing offset values associated with a HARQ-ACK codebook or information associated with a set of SLIVs for candidate data channels associated with the HARQ-ACK codebook. The transmission component 804 may transmit the HARQ-ACK codebook, the HARQ-ACK codebook being based at least in part on one or more of distinct values of the set of timing offset values or distinct values of the set of SLIVs.

The communication manager 808 may generate the HARQ-ACK codebook based at least in part on one or more of the distinct values of the set of timing offset values, or the distinct values of the set of SLIVs.

The reception component 802 may receive an indication that the HARQ-ACK codebook is to be based at least in part on one or more of distinct values of the set of timing offset values or distinct values of the set of SLIVs.

The communication manager 808 may determine the HARQ-ACK codebook.

The communication manager 808 may generate values of the distinct values of the set of timing offset values or distinct values of the set of SLIVs based at least in part on removing at least one value from the set of timing offset values or the set of SLIVs.

The communication manager 808 may determine the distinct values of the set of SLIVs from a set of time domain resource allocation parameters wherein a time domain resource allocation parameter in the set of time domain resource allocation parameters includes a slot parameter and a SLIV.

The communication manager 808 may determine that a first time domain resource allocation parameter includes a first slot parameter and a first SLIV.

The communication manager 808 may determine that a second time domain resources allocation parameter includes a second slot parameter and the first SLIV.

The communication manager 808 may include the first SLIV only once in the distinct values of the set of SLIVs.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
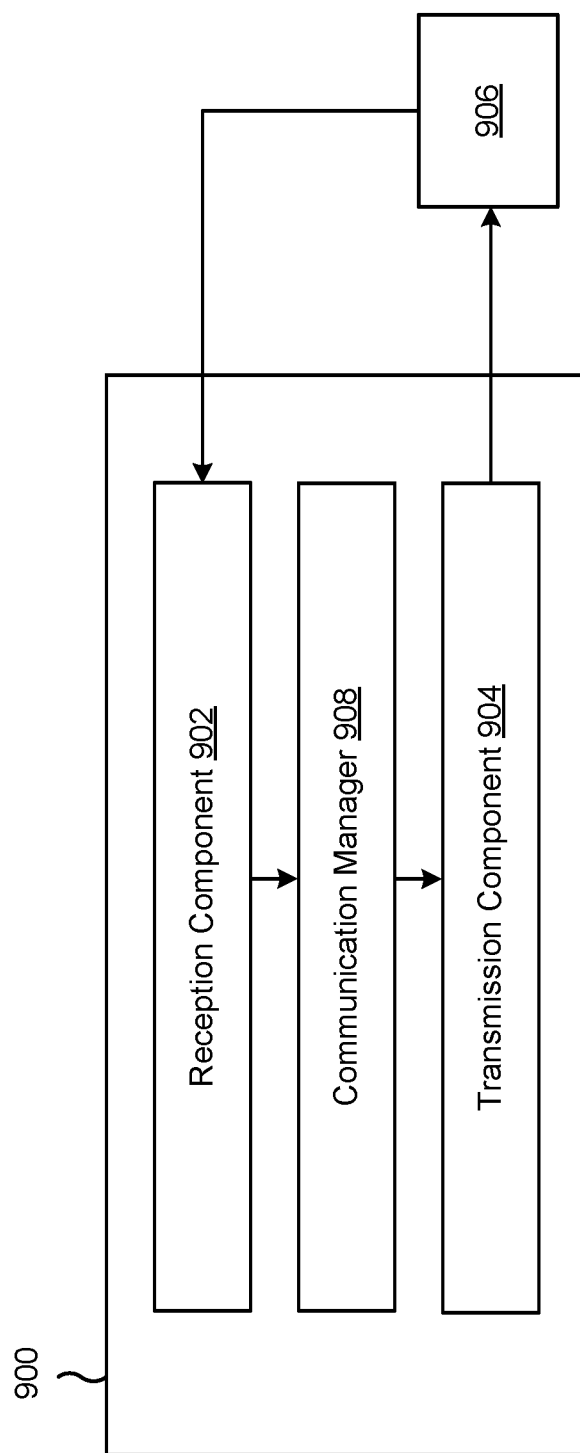

FIG. 9 is a diagram of an example apparatus 900 for wireless communication. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network node, or another wireless communication device) using the reception component 902 and the transmission component 904. As further shown, the apparatus 900 may include a communication manager 908 (e.g., the communication manager 150).

In some aspects, the apparatus 900 may be configured to perform one or more operations described herein in connection with FIG. 5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The transmission component 904 may transmit one or more of an indication of a set of timing offset values associated with a HARQ-ACK codebook or information associated with a set of SLIVs for candidate data channels associated with the HARQ-ACK codebook. The reception component 902 may receive the HARQ-ACK codebook, the HARQ-ACK codebook being based at least in part on one or more of distinct values of the set of timing offset values or distinct values of the set of SLIVs.

The transmission component 904 may transmit an indication that the HARQ-ACK codebook is to be based at least in part on one or more of distinct values of the set of timing offset values or distinct values of the set of SLIVs.

The communication manager 908 may determine the HARQ-ACK codebook.

The communication manager 908 may generate values of the distinct values of the set of timing offset values or distinct values of the set of SLIVs based at least in part on removing at least one value from the set of timing offset values or the set of SLIVs.

The communication manager 908 may determine the distinct values of the set of SLIVs from a set of time domain resource allocation parameters wherein a time domain resource allocation parameter in the set of time domain resource allocation parameters includes a slot parameter and a SLIV.

The communication manager 908 may determine that a first time domain resource allocation parameter includes a first slot parameter and a first SLIV.

The communication manager 908 may determine that a second time domain resources allocation parameters includes a second slot parameter and the first SLIV.

The communication manager 908 may include the first SLIV only once in the distinct values of the set of SLIVs.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving one or more of an indication of a set of timing offset values associated with a hybrid automatic repeat request acknowledgment (HARQ-ACK) codebook or information associated with a set of start and length indicator values (SLIVs) for candidate data channels associated with the HARQ-ACK codebook; and transmitting the HARQ-ACK codebook, the HARQ-ACK codebook being based at least in part on one or more of distinct values of the set of timing offset values or distinct values of the set of SLIVs.

Aspect 2: The method of Aspect 1, further comprising generating the HARQ-ACK codebook based at least in part on one or more of: the distinct values of the set of timing offset values, or the distinct values of the set of SLIVs.

Aspect 3: The method of any of Aspects 1-2, wherein the distinct values of the set of timing offset values comprise fewer values than the set of timing offset values, or wherein the distinct values of the set of SLIVs comprise fewer values than the set of SLIVs.

Aspect 4: The method of any of Aspects 1-3, further comprising: receiving an indication that the HARQ-ACK codebook is to be based at least in part on one or more of distinct values of the set of timing offset values or distinct values of the set of SLIVs.

Aspect 5: The method of any of Aspects 1-4, wherein the set of timing offset values is based at least in part on a union of a first subset of timing offset values and a second subset of timing offset values, or wherein the set of SLIVs is based at least in part on a union of a first subset of SLIVs associated with the information and a second subset of SLIVs associated with the information.

Aspect 6: The method of Aspect 5, wherein the first subset of timing offset values is indicated by first radio resource control (RRC) parameter and the second subset of timing offset values is indicated by a second RRC parameter, or wherein the information associated with the first subset of SLIVs is indicated by third RRC parameter and the second subset associated with the information associated with the second subset of SLIVs is indicated by a fourth RRC parameter.

Aspect 7: The method of any of Aspects 1-6, further comprising determining the HARQ-ACK codebook.

Aspect 8: The method of Aspect 7, wherein determining the HARQ-ACK codebook includes determining a size of the HARQ-ACK codebook.

Aspect 9: The method of Aspect 8, wherein the size of the HARQ-ACK codebook is based at least in part on one or more of the distinct values of the set of timing offset values or the distinct values of the set of SLIVs.

Aspect 10: The method of any of Aspects 1-9, further comprising: generating values of the distinct values of the set of timing offset values or distinct values of the set of SLIVs based at least in part on removing at least one value from the set of timing offset values or the set of SLIVs.

Aspect 11: The method of any of Aspects 1-10, further comprising: determining the distinct values of the set of SLIVs from a set of time domain resource allocation parameters, wherein a time domain resource allocation parameter in the set of time domain resource allocation parameters includes a slot parameter and a SLIV.

Aspect 12: The method of Aspect 11, further comprising: determining that a first time domain resource allocation parameter includes a first slot parameter and a first SLIV; determining that a second time domain resources allocation parameter includes a second slot parameter and the first SLIV; and including the first SLIV only once in the distinct values of the set of SLIVs.

Aspect 13: A method of wireless communication performed by a network node, comprising: transmitting one or more of an indication of a set of timing offset values associated with a hybrid automatic repeat request acknowledgment (HARQ-ACK) codebook or information associated with a set of start and length indicator values (SLIVs) for candidate data channels associated with the HARQ-ACK codebook; and receiving the HARQ-ACK codebook, the HARQ-ACK codebook being based at least in part on one or more of distinct values of the set of timing offset values or distinct values of the set of SLIVs.

Aspect 14: The method of Aspect 13, wherein receiving the HARQ-ACK codebook comprises: decoding the HARQ-ACK codebook based at least in part on a transmitting user equipment generating the HARQ-ACK codebook based at least in part on one or more of: the distinct values of the set of timing offset values, or the distinct values of the set of SLIVs.

Aspect 15: The method of any of Aspects 13-14, wherein the distinct values of the set of timing offset values comprises fewer values than the set of timing offset values, or wherein the distinct values of the set of SLIVs comprises fewer values than the set of SLIVs.

Aspect 16: The method of any of Aspects 13-15, further comprising: transmitting an indication that the HARQ-ACK codebook is to be based at least in part on one or more of distinct values of the set of timing offset values or distinct values of the set of SLIVs.

Aspect 17: The method of any of Aspects 13-16, wherein the set of timing offset values is based at least in part on a union of a first subset of timing offset values and a second subset of timing offset values, or wherein the set of SLIVs is based at least in part on a union of a first subset of SLIVs associated with the information and a second subset of SLIVs associated with the information.

Aspect 18: The method of Aspect 17, wherein the first subset of timing offset values is indicated by first radio resource control (RRC) parameter and the second subset of timing offset values is indicated by a second RRC parameter, or wherein the information associated with the first subset of SLIVs is indicated by third RRC parameter and the second subset associated with the information associated with the second subset of SLIVs is indicated by a fourth RRC parameter.

Aspect 19: The method of any of Aspects 13-18, further comprising determining the HARQ-ACK codebook.

Aspect 20: The method of Aspect 19, wherein determining the HARQ-ACK codebook includes determining a size of the HARQ-ACK codebook.

Aspect 21: The method of Aspect 20, wherein the size of the HARQ-ACK codebook is based at least in part on one or more of the distinct values of the set of timing offset values or the distinct values of the set of SLIVs.

Aspect 22: The method of any of Aspects 13-21, wherein, based at least in part on a configuration of the network node, one or more of: the distinct values of the set of timing offset values comprise a same number of values than the set of timing offset values, or wherein the distinct values of the set of SLIVs comprise a same number of values than the set of SLIVs.

Aspect 23: The method of any of Aspects 13-22, further comprising: generating values of the distinct values of the set of timing offset values or distinct values of the set of SLIVs based at least in part on removing at least one value from the set of timing offset values or the set of SLIVs.

Aspect 24: The method of any of Aspects 13-23, further comprising: determining the distinct values of the set of SLIVs from a set of time domain resource allocation parameters, wherein a time domain resource allocation parameter in the set of time domain resource allocation parameters includes a slot parameter and a SLIV.

Aspect 25: The method of Aspect 24, further comprising: determining that a first time domain resource allocation parameter includes a first slot parameter and a first SLIV; determining that a second time domain resources allocation parameters includes a second slot parameter and the first SLIV; and including the first SLIV only once in the distinct values of the set of SLIVs.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive one or more of an indication of a set of timing offset values associated with a hybrid automatic repeat request acknowledgment (HARQ-ACK) codebook or information associated with a set of start and length indicator values (SLIVs) for candidate data channels associated with the HARQ-ACK codebook; and
      transmit the HARQ-ACK codebook, the HARQ-ACK codebook being based at least in part on one or more of distinct values of the set of timing offset values or distinct values of the set of SLIVs.

2. The UE of claim 1, wherein the one or more processors are further configured to generate the HARQ-ACK codebook based at least in part on one or more of:
the distinct values of the set of timing offset values, or
the distinct values of the set of SLIVs.

3. The UE of claim 1, wherein the distinct values of the set of timing offset values comprise fewer values than the set of timing offset values, or
wherein the distinct values of the set of SLIVs comprise fewer values than the set of SLIVs.

4. The UE of claim 1, wherein the one or more processors are further configured to:
receive an indication that the HARQ-ACK codebook is to be based at least in part on one or more of distinct values of the set of timing offset values or distinct values of the set of SLIVs.

5. The UE of claim 1, wherein the set of timing offset values is based at least in part on a union of a first subset of timing offset values and a second subset of timing offset values, or
wherein the set of SLIVs is based at least in part on a union of a first subset of SLIVs associated with the information and a second subset of SLIVs associated with the information.

6. The UE of claim 5, wherein the first subset of timing offset values is indicated by first radio resource control (RRC) parameter and the second subset of timing offset values is indicated by a second RRC parameter, or
wherein the information associated with the first subset of SLIVs is indicated by third RRC parameter and the second subset associated with the information associated with the second subset of SLIVs is indicated by a fourth RRC parameter.

7. The UE of claim 5, wherein the first subset of timing offset values and the second subset of timing offset values do not contain duplicated timing offset values, or
wherein the first subset of SLIV and the second subset of SLIV do not contain duplicated SLIV.

8. The UE of claim 1, wherein the one or more processors are further configured to determine the HARQ-ACK codebook.

9. The UE of claim 8, wherein the one or more processors, to determine the HARQ-ACK codebook, are configured to determine a size of the HARQ-ACK codebook.

10. The UE of claim 9, wherein the size of the HARQ-ACK codebook is based at least in part on one or more of the distinct values of the set of timing offset values or the distinct values of the set of SLIVs.

11. The UE of claim 1, wherein the one or more processors are further configured to:
generate values of the distinct values of the set of timing offset values or distinct values of the set of SLIVs based at least in part on removing at least one value from the set of timing offset values or the set of SLIVs.

12. The UE of claim 1, wherein the one or more processors are further configured to:
determine the distinct values of the set of SLIVs from a set of time domain resource allocation parameters, wherein a time domain resource allocation parameter in the set of time domain resource allocation parameters includes a slot parameter and a SLIV.

13. The UE of claim 12, wherein the one or more processors are further configured to:
determine that a first time domain resource allocation parameter includes a first slot parameter and a first SLIV;
determine that a second time domain resources allocation parameter includes a second slot parameter and the first SLIV; and
include the first SLIV only once in the distinct values of the set of SLIVs.

14. A network node for wireless communication, comprising:
one or more memories; and
one or more processors, coupled to the one or more memories, configured to:
transmit one or more of an indication of a set of timing offset values associated with a hybrid automatic repeat request acknowledgment (HARQ-ACK) codebook or information associated with a set of start and length indicator values (SLIVs) for candidate data channels associated with the HARQ-ACK codebook; and
receive the HARQ-ACK codebook, the HARQ-ACK codebook being based at least in part on one or more of distinct values of the set of timing offset values or distinct values of the set of SLIVs.

15. The network node of claim 14, wherein the one or more processors, to receive the HARQ-ACK codebook, are configured to:
decode the HARQ-ACK codebook based at least in part on a transmitting user equipment generating the HARQ-ACK codebook based at least in part on one or more of:
the distinct values of the set of timing offset values, or
the distinct values of the set of SLIVs.

16. The network node of claim 14, wherein the distinct values of the set of timing offset values comprises fewer values than the set of timing offset values, or
wherein the distinct values of the set of SLIVs comprises fewer values than the set of SLIVs.

17. The network node of claim 14, wherein the one or more processors are further configured to:
transmit an indication that the HARQ-ACK codebook is to be based at least in part on one or more of distinct values of the set of timing offset values or distinct values of the set of SLIVs.

18. The network node of claim 14, wherein the set of timing offset values is based at least in part on a union of a first subset of timing offset values and a second subset of timing offset values, or
wherein the set of SLIVs is based at least in part on a union of a first subset of SLIVs associated with the information and a second subset of SLIVs associated with the information.

19. The network node of claim 18, wherein the first subset of timing offset values is indicated by first radio resource control (RRC) parameter and the second subset of timing offset values is indicated by a second RRC parameter, or
wherein the information associated with the first subset of SLIVs is indicated by third RRC parameter and the second subset associated with the information associated with the second subset of SLIVs is indicated by a fourth RRC parameter.

20. The network node of claim 14, wherein the one or more processors are further configured to determine the HARQ-ACK codebook.

21. The network node of claim 20, wherein the one or more processors, to determine the HARQ-ACK codebook, are configured to determine a size of the HARQ-ACK codebook.

22. The network node of claim 21, wherein the size of the HARQ-ACK codebook is based at least in part on one or more of the distinct values of the set of timing offset values or the distinct values of the set of SLIVs.

23. The network node of claim 14, wherein, based at least in part on a configuration of the network node, one or more of:
the distinct values of the set of timing offset values comprise a same number of values than the set of timing offset values, or
wherein the distinct values of the set of SLIVs comprise a same number of values than the set of SLIVs.

24. The network node of claim 14, wherein the one or more processors are further configured to:
generate values of the distinct values of the set of timing offset values or distinct values of the set of SLIVs based at least in part on removing at least one value from the set of timing offset values or the set of SLIVs, or
determine the distinct values of the set of SLIVs from a set of time domain resource allocation parameters, wherein a time domain resource allocation parameter in the set of time domain resource allocation parameters includes a slot parameter and a SLIV.

25. The network node of claim 24, wherein the one or more processors are further configured to:
determine that a first time domain resource allocation parameter includes a first slot parameter and a first SLIV;
determine that a second time domain resources allocation parameters includes a second slot parameter and the first SLIV; and
include the first SLIV only once in the distinct values of the set of SLIVs.

26. A method of wireless communication performed by a user equipment (UE), comprising:
receiving one or more of an indication of a set of timing offset values associated with a hybrid automatic repeat request acknowledgment (HARQ-ACK) codebook or information associated with a set of start and length indicator values (SLIVs) for candidate data channels associated with the HARQ-ACK codebook; and
transmitting the HARQ-ACK codebook, the HARQ-ACK codebook being based at least in part on one or more of distinct values of the set of timing offset values or distinct values of the set of SLIVs.

27. The method of claim 26, further comprising:
receiving an indication that the HARQ-ACK codebook is to be based at least in part on one or more of distinct values of the set of timing offset values or distinct values of the set of SLIVs.

28. The method of claim 26, further comprising:
generating values of the distinct values of the set of timing offset values or distinct values of the set of SLIVs based at least in part on removing at least one value from the set of timing offset values or the set of SLIVs.

29. A method of wireless communication performed by a network node, comprising:
transmitting one or more of an indication of a set of timing offset values associated with a hybrid automatic repeat request acknowledgment (HARQ-ACK) codebook or information associated with a set of start and length indicator values (SLIVs) for candidate data channels associated with the HARQ-ACK codebook; and
receiving the HARQ-ACK codebook, the HARQ-ACK codebook being based at least in part on one or more of distinct values of the set of timing offset values or distinct values of the set of SLIVs.

30. The method of claim 29, further comprising:
transmitting an indication that the HARQ-ACK codebook is to be based at least in part on one or more of distinct values of the set of timing offset values or distinct values of the set of SLIVs.

\* \* \* \* \*